(12) United States Patent
Kawano et al.

(10) Patent No.: US 6,657,010 B2
(45) Date of Patent: *Dec. 2, 2003

(54) OIL-RESISTANT RUBBER MODIFIED POLYSTYRENE COMPOSITION

(75) Inventors: Koji Kawano, Osaka (JP); Kenichiro Matsuba, Chiba (JP)

(73) Assignee: Toyo Engineering Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/983,480

(22) Filed: Oct. 24, 2001

(65) Prior Publication Data

US 2002/0077425 A1 Jun. 20, 2002

(30) Foreign Application Priority Data

| Oct. 24, 2000 | (JP) | ........................ 2000-323802 |
| Jan. 15, 2001 | (JP) | ........................ 2001-006545 |
| Mar. 19, 2001 | (JP) | ........................ 2001-078513 |

(51) Int. Cl.$^7$ .................... C08F 297/02; C08L 51/04
(52) U.S. Cl. .................. 525/217; 525/223; 525/232; 525/238; 525/241
(58) Field of Search .................. 525/217, 223, 525/232, 238, 241

(56) References Cited

U.S. PATENT DOCUMENTS

| 3,513,145 A | 5/1970 | Crawford |
| 3,694,535 A | 9/1972 | Kimoto et al. |
| 4,187,260 A | 2/1980 | Kruse et al. |
| 4,315,083 A | 2/1982 | Burk |
| 4,433,099 A | 2/1984 | Küpper et al. |
| 4,952,627 A | 8/1990 | Morita et al. |
| 5,543,461 A | 8/1996 | Nke-Aka et al. |
| 5,891,962 A | * 4/1999 | Otsuzuki et al. ............ 525/316 |
| 6,420,483 B1 | * 7/2002 | Mc Kee et al. ............ 525/191 |

FOREIGN PATENT DOCUMENTS

| EP | 0 905 149 | 3/1999 |
| JP | 61-228012 | 10/1986 |
| JP | 8-12845 | 1/1996 |
| JP | 8-504450 | 5/1996 |
| WO | WO 94/12551 | 6/1994 |
| WO | WO 99/50314 | 10/1999 |

* cited by examiner

*Primary Examiner*—Nathan M. Nutter
(74) *Attorney, Agent, or Firm*—Oblon, Spivak, McClelland, Maier & Neustadt, P.C.

(57) ABSTRACT

An oil resistant rubber modified polystyrene composition comprises polybutadiene rubber particles having an average volume particle diameter of 6 to 13 $\mu$m dispersed in polystyrene. The oil resistant rubber modified polystyrene of the present invention has a gel content of 25 to 35% by weight, a degree of swelling of 13 to 22, a residual volatile content of 2000 ppm or less, and a total amount of dimer and trimer of 8000 ppm or less. The oil resistant rubber modified polystyrene composition may be prepared by polymerizing styrene in the presence of polybutadiene rubber, foaming a solution of the rubber modified polystyrene under a reduced pressure of 3 to 40 mm Hg, heating the solution in a tubular heater to a temperature of 190 to 230° C., and then flushing the heated solution into a gas-liquid separator to devolatilize an unreacted monomer and a solvent therefrom.

23 Claims, 1 Drawing Sheet

OIL-RESISTANT RUBBER MODIFIED POLYSTYRENE COMPOSITION

BACKGROUND OF THE INVENTION

1. Field of the Invention

The present invention relates to a rubber modified polystyrene composition having excellent environmental stress-crack resistance (ESCR) properties, and more specifically, it relates to an oil-resistant rubber modified polystyrene composition.

2. Description of the Prior Art

In general, rubber modified polystyrenes have good moldability and excellent physical properties, and have been used in various applications. However, conventional rubber modified polystyrenes have poor oil resistance and flon resistance, and for this reason, they tend to form environmental stress cracks and exhibit various other problems after only a short period of use. The resistance of various rubber modified polystyrenes to environmental stress-cracks caused by exposure to long chain oils or a fats has been studied, for example in Japanese PCT Patent Application Laid-Open No. 504450/1996 and Japanese Patent Application Laid-Open No. 12845/1996, which describe oil-resistant rubber modified polystyrenes which may be used as margarine containers, trays for refrigerators and the like.

Recently, resins used in food packaging have been required, as much as possible, to have reduced level of residual unreacted monomers and volatile components, such as polymerization solvents. By volatile components, we mean components of the rubber modified polystyrene composition, usually low molecular weight compounds, capable of vaporizing at a temperature of 230° C. or less, and/or a pressure of 760 mm Hg or less. Volatile components may therefore include unreacted monomers, dimers and trimers thereof, solvents, water, etc. Because it is now apparent that dimers and trimers of the monomers from which the composition is polymerized may be endocrine disruptors, residual levels of these dimers and trimers must be reduced as much as possible in resins used in food containers, for example, edible oil containers, cups for juices, and the like.

Conventionally, resins having lower amounts of residual volatile components are prepared by heating the polymerization solution up to higher temperatures, or by reducing the pressure during the devolatilization step, so that the unreacted monomer and solvent are devolatilized from the polymerization solution. However, heating the polymerization solution to a higher temperature, decreases the degree of swelling and impairs the oil resistance of the resins thus formed, and the amount of residual dimer and trimer in the resin increases as the treatment temperature increases. In addition, reducing the pressure during devolatilization of the resin, and monomer and solvent recovery have the disadvantage of requiring additional energy.

SUMMARY OF THE INVENTION

Accordingly, the present invention provides oil-resistant rubber modified polystyrene composition having reduced levels of residual volatile substances, as well as reduced levels of dimer and trimer. The present inventors have found that the oil-resistance properties of the rubber modified polystyrene are affected by the average volume particle diameter of the rubber phase, and the gel content and degree of swelling of the composition. Moreover, the devolatilization method also affects the oil-resistance properties, the degree of swelling and the level of residual volatile substances, dimer, and trimer.

DETAILED DESCRIPTION OF THE INVENTION

Figure 1:
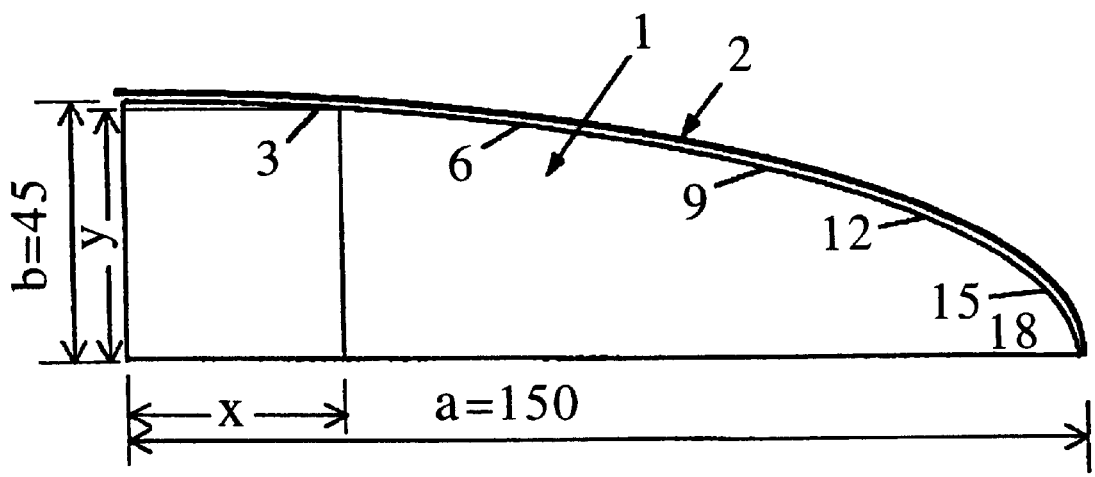
FIG. 1 is a ¼ ellipsoidal jig with a scale for visually observing the occurrence of crazing or cracks in a sample of a rubber modified polystyrene composition according to the present invention.

The first embodiment of the present invention provides a rubber modified polystyrene composition in which polybutadiene rubber particles having an average volume particle diameter of 6 to 13 μm are dispersed in polystyrene. The gel content of the composition is preferably in the range of 25 to 35% by weight, the degree of swelling is in the range of 13 to 22, the residual volatile content is 2000 ppm or less, and the total amount of dimer and a trimer is 8000 ppm or less.

The rubber modified polystyrene composition of the present invention, comprises polybutadiene rubber particles dispersed in polystyrene. The polybutadiene rubber preferably has a Mooney viscosity measured at 100° C. (i.e., $ML_{1+4}(100° C.)$) of 40 to 80, and a 5.43% by weight toluene solution of the polybutadiene rubber preferably has a viscosity at 25° C. of 50 to 300 centipoise. The polybutadiene rubber may be any conventional polybutadiene rubber, including butadiene homopolymers and copolymers with other suitable monomers such as styrene and acrylonitrile. In addition, the polybutadiene may be cis or trans 1,4-polybutdiene, or combinations thereof, or have any combination of 1,2- or 1,4-butdiene units. Examples of suitable polybutadiene rubbers include NF55A (trade name, made by Asahi Chemical Industry Co., Ltd.), DIENE 55AC and 70AC (trademarks, made by Firestone Co., Ltd.), Taktene 550 and 710, Buna CB HX530 and Buna CB1414 (trade names, made by Beyer AG), and BR1220SU (trade names, made by Nippon Zeon Co., Ltd.).

The polystyrene matrix preferably has a weight-average molecular weight of 140,000 to 280,000. The polystyrene phase of the rubber modified polystyrene of the present invention is a polymer of styrene or a copolymer of styrene and at least one monomer copolymerizable with styrene in an amount of preferably 10% by weight or less. Preferable examples of the monomer copolymerizable with styrene include α-methylstyrene, p-methylstyrene, acrylonitrile, methacrylonitrile, methyl acrylate, n-butyl acrylate, methyl methacrylate, maleic anhydride, maleimide, N-phenylmaleimide, methacrylic acid and mixtures thereof The rubber modified polystyrene composition of the present invention may be prepared by any suitable process, and is not limited to any particular method. For example, the rubber modified polystyrene may be prepared by conventional suspension polymerization or bulk polymerization methods, in which polystyrene is polymerized in the presence of polybutadiene rubber. Methods for preparing rubber modified polystyrene are described, for example, in Kirk-Othmer Encyclopedia of Chemical Technology, Fourth Edition, Volume 19, John Wiley & Sons, New York (1996) pages 860–862, and references described therein, herein incorporated by reference. Because polystyrene is immiscible with the polybutadiene rubber, during the polymerization, the polybutadiene rubber phase separates from the polystyrene matrix in the form of small particles of polybutadiene rubber suspended in the polystyrene matrix.

In order to regulate the molecular weight or a rate of the polymerization, a molecular weight modifier such as a sulfur compound, or a reaction initiator such as a peroxide (e.g., organic peroxides such as benzoyl peroxide, cumyl peroxide, etc.), and azo compounds (e.g., azobisisobutyronitrile, etc.) may be added to the reaction mixture.

The rubber modified polystyrene of the present invention may be prepared in the presence of the solvent, for example, for the purpose of reducing the viscosity of the polymerization solution, promoting heat transfer for the removal of polymerization heat, and for allowing proper stirring in order to prevent localized heating. Examples of the suitable solvents include benzene, toluene, ethylbenzene, xylene and mixtures thereof Conventional rubber modified polystyrenes have a rubber phase with an average volume particle diameter of about 2 to 5 $\mu$m. Such conventional rubber modified polystyrenes have little, if any, oil-resistance properties. Accordingly, the present inventors have found that it is necessary that the rubber phase should have a particle diameter of 6 $\mu$m or more. If the particle diameter is larger than 6 $\mu$m, the oil-resistance properties of the rubber modified polystyrene may increase, but if the particle diameter is too large, the impact strength of the rubber modified polystyrene decreases. Accordingly, the average volume particle diameter is preferably 13 $\mu$m or less, more preferably in a range of 8 to 11 $\mu$m.

The gel content of the rubber modified polystyrene composition of the present invention is preferably 25 to 35% by weight.

The degree of swelling of the rubber modified polystyrene composition of the present invention is preferably large, but if the degree of swelling is too large, the stiffness and impact resistance of the rubber modified polystyrene decreases. Accordingly, the degree of swelling is preferably 13 to 22, more preferably 14 to 18.

The rubber modified polystyrene composition of the first embodiment may be prepared by polymerizing styrene, or a mixture of styrene and a suitable comonomer, in the presence a polybutadiene rubber dissolved in the styrene, a mixture of the styrene and a solvent or a mixture of the styrene and a suitable comonomer to form a polymerization solution comprising the rubber modified polystyrene of the present invention. The polymerization solution is then first foamed at a pressure reduced to, or below that of the vapor pressure of the polymerization solution at the polymerization temperature, then passed through a tubular heater while maintaining a uniform flow rate distribution. The heated polymerization solution is then flushed into a gas-liquid separator to devolatilize any unreacted monomer and solvent therefrom. The pressure in the gas-liquid separator is maintained in the range of 3 to 40 mm Hg and the temperature of the flushed rubber modified polystyrene composition is maintained at a temperature of from 190 to 230° C.

A second embodiment of the present invention is directed to a rubber modified polystyrene composition, as described above, in which polybutadiene rubber particles are dispersed in a polystyrene, and the average volume particle diameter of the polybutadiene rubber particles is in the range of 6 to 13 $\mu$m, the gel content is in the range of 25 to 35% by weight, the degree of swelling is in the range of 13 to 22, the residual volatile content is 400 ppm or less, and the total level of dimer and trimer is 4500 ppm or less. The rubber modified polystyrene composition of the second embodiment may be prepared by polymerizing styrene in the presence of polybutadiene rubber, as described above, to form a polymerization solution comprising the rubber modified polystyrene of the present invention, then treating the polymerization solution in an apparatus comprising a pressure adjusting valve, a vertically arranged multitubular heat exchanger type preheater having an ellipsoidal, dished, hemispherical or partially spherical head at an upper position thereof, and a devolatilizing tank directly connected to the multitubular heat exchanger type preheater. The treatment is carried out by introducing the polymerization solution into the head of the multitubular heat exchanger type preheater through the pressure adjusting valve, heating the solution with the multitubular heat exchanger type preheater, thereby foaming the solution, separating a portion of the unreacted monomer and solvent in the devolatilizing tank, discharging a solution containing the rubber modified polystyrene of the present invention and 3 to 15% by weight of the unreacted monomer and the solvent, referred to as the primary treated solution, through the bottom of the devolatilizing tank. The primary treated solution is then subjected to a second treatment in an apparatus comprising a conduit, a vertically arranged multitubular heat exchanger type preheater having an ellipsoidal, dished, hemispherical or partially spherical head at an upper position thereof, and a devolatilizing tank directly connected to the multitubular heat exchanger type preheater. The second treatment is carried out by introducing the primary treated solution into the head of the multitubular heat exchanger type preheater through the conduit, heating the solution by means of the multitubular heat exchanger type preheater, thereby foaming the solution, and then separating substantially the remaining portion of the unreacted monomer and the solvent in the devolatilizing tank. In the first treatment, the temperature of the primary treated solution is maintained at a temperature of 150 to 180° C. and the pressure in the devolatilizing tank is maintained at a pressure of 200 to 600 mm Hg. In the second treatment, the temperature of the rubber modified polystyrene composition is maintained at a temperature of 190 to 230° C. and the pressure in the devolatilizing tank is maintained at a pressure of 10 mm Hg or less.

A third embodiment of the present invention is directed to a rubber modified polystyrene composition comprising polybutadiene rubber particles dispersed in a polystyrene, where the average volume particle diameter of the polybutadiene rubber particles is in the range of 6 to 13 $\mu$m, the gel content is in a range of 25 to 35% by weight, the degree of swelling is in the range of 13 to 22, the residual volatile content is 100 ppm or less, and the total amount of dimer and trimer is 1500 ppm or less. The rubber modified polystyrene composition of the third embodiment may be prepared by polymerizing styrene in the presence of polybutadiene rubber dissolved in the styrene, a mixture of the styrene and a solvent or a mixture of the styrene and a suitable comonomer to form a polymerization solution comprising the rubber modified polystyrene of the present invention, then treating the polymerization solution in an apparatus comprising a pressure adjusting valve, a vertically arranged multitubular heat exchanger type preheater having an ellipsoidal, dished, hemispherical or partially spherical head at an upper position thereof, and a devolatilizing tank directly connected to the multitubular heat exchanger type preheater. The first treatment step is carried out by introducing the polymerization solution into the head through the pressure adjusting valve, heating the polymerization solution by means of the multitubular heat exchanger type preheater, thereby foaming the polymerization solution, separating most of the unreacted monomer and the solvent in the devolatilizing tank, then discharging from the devolatilizing tank a solution containing the rubber modified polystyrene of the present invention and 2% by weight or less of unreacted monomer and the solvent, referred to as a primary treated solution, through the bottom of the devolatilizing tank. In a second treatment step, the primary treated solution is treated in an apparatus comprising a nozzle device for adding foaming agent, a static mixer, an extruding apparatus and a devolatilizing tank. The second treatment step is carried out by adding, through the nozzle device, a foaming agent into the primary treated solution in a direction opposite to the flow direction of the primarily treated solution, introducing the solution into a static mixer at a temperature higher than the vaporization temperature of the foaming agent under atmospheric pressure and lower than the decomposition temperature of the primary treated solution and under a pressure sufficient to prevent the primary treated solution from foaming, mixing the primary treated solution containing the foaming agent in the static mixer while maintaining a pressure higher than the vapor pressure of the foaming agent, introducing the mixture resulting from the static mixer into the devolatilizing tank through an extruding apparatus having at least one opening section provided vertically and downward, forming the mixture into a foamed product at such a temperature and a pressure that a foaming coefficient B in the following equation (1) is 1.4 or more, whereby the unreacted monomer and the solvent are devolatilized together with the release of a foaming agent, and then separating the unreacted monomer, the solvent and the foaming agent in the devolatilizing tank. In the first treatment step, the temperature of the primary treated solution is in the range of 180 to 220° C., the pressure in the devolatilizing tank is in the range of 3 to 120 mm Hg, and the foaming agent comprises 0.5 to 3% by weight of water added to the primary treated solution. In the second treatment step, the pressure in the devolatilizing tank is in the range of 10 to 20 mm Hg, and the temperature of the rubber modified polystyrene composition is in the range of 190 to 230° C. In the second treatment step, the coefficient B is defined by equation (1):

$$B = A'/A \quad (1)$$

wherein A is the cross-sectional area of the opening of the extruding apparatus, and A' is the average cross-sectional area of the foamed polymer composition in a direction perpendicular to a vertical direction at a position 50 cm to 1 m, in a vertical direction, below the opening.

The devolatilization techniques described in Japanese Patent Publication Nos. 29797/1973 and 827/1994, and Japanese Patent Application Laid-Open No. 166014/1999, each of which is herein incorporated by reference, may be used in the above described first, second and third aspects of the invention, respectively.

In the above-described first, second and third embodiments of the present invention, the residual volatile content of the rubber modified polystyrene compositions are 2000 ppm or less, 400 ppm or less and 100 ppm or less, respectively, and the total amount of dimer and trimer are 8000 ppm or less, 4500 ppm or less and 1500 ppm or less, respectively.

The invention will described more in detail referring to the following examples and comparative examples.

The average volume particle diameter of the polybutadiene rubber phase of the rubber modified polystyrene composition according to the present invention was measured by a laser analysis type particle-size distribution measuring device.

The gel content was measured as follows: 1 g of the rubber modified polystyrene composition was dissolved in 30 ml of a $^2/_3$ methyl ethyl ketone/methanol solution, followed by centrifugal separation of the undissolved material from the dissolved material. The undissolved material was vacuum-dried, and then weighed to measure the gel weight, G (units of grams). The gel content was calculated as follows: gel content=G/1×100 (%).

The degree of swelling was measured as follow. 0.4 g of the rubber modified polystyrene composition was mixed with 20 ml of toluene, followed by centrifugal separation of the undissolved material from the dissolved material. The resultant supernatant liquid containing the dissolved material was decanted, and the weight TG (units of grams) of the remaining gel was then measured. Next, this gel was vacuum-dried, and a weight DG (units of grams) of the dried gel was then measured. The degree of swelling was calculated as the ratio TG/DG.

As shown in FIG. 1, the oil-resistance properties were measured as follows: First, the rubber modified polystyrene composition was molded into a test piece having a width of 50 mm, a length of 150 mm and a thickness of 1.3 mm. This test piece was then attached to a ¼ ellipsoidal jig with a scale (i.e., FIG. 1). Oil was applied on the test piece, and after 24 hours, the smallest graduation (n) at the position where crazing or cracking occurred on the test piece was recorded. The critical strain (F) was calculated in accordance with the following equation:

$$\varepsilon = \frac{bt}{2a^2}\left(1 - \frac{a^2-b^2}{a^4}X^2\right)^{\left(\frac{-3}{2}\right)}$$

wherein
- a is the length of the long axis (150 mm) of the ¼ ellipsoidal jig,
- b is the length of the short axis (45 mm) of the ¼ ellipsoidal jig, and
- t is the thickness (1.3 mm) of the test piece.

The graduation (n), is determined by the equation n=(90-θ)/5, where X=acos θ and Y=b sin θ and angle θ is an eccentric angle, and the X axis is the long axis of the ellipse, and the Y axis is the short axis of the ellipse.

Thus, as the value of e increase, the oil resistance properties of the rubber modified polystyrene composition increase. The evaluation of the results was ranked as follows:

A critical strain of 0.47 or more is indicated by the symbol:○

A critical strain of 0.19 to 0.47 is indicated by the symbol:β

A critical strain of 0.19 or less is indicated by the symbol:X

EXAMPLE 1

A rubber modified polystyrene composition having a polybutadiene phase of particles of DIENE 70AC (made by Firestone Co., Ltd.), a gel content of 30.6% by weight, an average volume particle diameter of rubber particles of 9 μm, a degree of swelling of 16, a residual volatile content of 1840 ppm, and a total amount of dimer and trimer of 7550 ppm was prepared using a devolatilization procedure according to the first embodiment of the present invention, described above. The pressure of the gas-liquid separating section of the apparatus was set to 30 mm Hg, and the temperature of the flushed rubber modified polystyrene was set at 200° C. When a critical strain was measured, no cracks were observed after exposure to any oil. The results are shown in Table 1.

EXAMPLE 2

A rubber modified polystyrene composition having a polybutadiene phase of particles of DIENE 70AC (made by Firestone Co., Ltd.), a gel content of 27.3% by weight, an average volume particle diameter of rubber particles of 8.7 μm, a degree of swelling of 17.4, a residual volatile content of 380 ppm, and a total amount of dimer and trimer of 3600 ppm was prepared using the devolatilization procedure according to the second embodiment of the present invention, described above. In the first step, the pressure of the devolatilizing tank was set to 400 mm Hg and the temperature of the flushed rubber modified polystyrene was set at 170° C. In the second step, the pressure of the devolatilizing tank was set to 5 mm Hg, and the temperature of the flushed rubber modified polystyrene was set to 200° C. When a critical strain was measured, no cracks were observed after exposure to any oil. The results are shown in Table 1.

EXAMPLE 3

A rubber modified polystyrene composition having a polybutadiene phase of particles of DIENE 55AC (made by Firestone Co., Ltd.), a gel content of 28.3% by weight, a degree of swelling of 14.3, a residual volatile content of 60 ppm, and a total amount of dimer and trimer of 950 ppm was prepared using the devolatilization procedure according to the third embodiment of the present invention, described above. In the first step, the pressure of the devolatilizing tank was set to 50 mm Hg, and the temperature of the flushed rubber modified polystyrene was set to 215° C. In the second step, water was used as the foaming agent, the pressure of the devolatilizing tank was set to 10 mm Hg, and the temperature of the flushed rubber modified polystyrene was set to 200° C. When a critical strain was measured, no cracks were observed after exposure to any oil. The results are shown in Table 1.

EXAMPLE 4

A rubber modified polystyrene composition was prepared according to the procedure of Example 2, and the weight-average molecular weight of the polystyrene phase was 220,000. When a critical strain was measured, no cracks were observed after exposure to any oil. The results are shown in Table 1.

EXAMPLE 5

A rubber modified polystyrene composition having a polybutadiene phase of particles of BR1220SU (made by Nippon Zeon Co., Ltd.), a gel content of 28.8% by weight, a degree of swelling of 15.8, a residual volatile content of 350 ppm, and a total amount of dimer and trimer of 2800 ppm was prepared using the devolatilization procedure according to the second embodiment of the present invention. In the first step, the pressure of the devolatilizing tank was set to 400 mm Hg and the temperature of the flushed rubber modified polystyrene was set to 170° C. In the second step, the pressure of the devolatilizing tank was set to 5 mm Hg and the temperature of the flushed rubber modified polystyrene was set to 200° C. When a critical strain was measured, no cracks were observed after exposure to any oil. The results are shown in Table 1.

COMPARATIVE EXAMPLE 1

A rubber modified polystyrene composition was prepared according to the procedure as in Example 1 except that the pressure of the gas-liquid separating section was set to 20 mm Hg, and the temperature of the flushed rubber modified polystyrene was set to 240° C. in the devolatilization procedure according to the first embodiment of the present invention. The critical strain was then measured. The results are shown in Table 1.

COMPARATIVE EXAMPLE 2

A rubber modified polystyrene composition was prepared according to the procedure of Example 2, except that the temperature of the flushed rubber modified polystyrene of the first step was set to 190° C., and the temperature of the flushed rubber modified polystyrene of the second step was set to 220° C. in the devolatilization process according to the second embodiment of the present invention. The critical strain was then measured. The results are shown in Table 1.

COMPARATIVE EXAMPLE 3

A rubber modified polystyrene composition was prepared according to the procedure of Example 3, except that in the devolatilization process according to the third embodiment of the present invention, the temperature of the flushed rubber modified polystyrene in the first step was set to 235° C., and the temperature of the flushed rubber modified polystyrene of the second step was set to 215° C. The critical strain was then measured. The results are shown in Table 1.

COMPARATIVE EXAMPLE 4

A rubber modified polystyrene composition was prepared according to the procedure of Example 1, except that in the devolatilization process, the polymerization liquid was heated up to 240° C. by a horizontal shell-and-tube type preheater and then flushed into a devolatilization tank maintained at 5 mm Hg. The critical strain was then measured. The results are shown in Table 1.

COMPARATIVE EXAMPLE 5

A conventional rubber modified polystyrene composition in which the polybutadiene phase was DIENE 55AC particles (made by Firestone Co., Ltd.), and the gel content, the degree of swelling, and the average volume particle diameter were each lower than in Examples 1 to 5, above, was prepared using a devolatilization procedure according to the first embodiment of the present invention. The critical strain was then measured. The results are shown in Table 1.

TABLE 1 (1)

|  | Example 1 | Example 2 |
|---|---|---|
| Gel Content (% by weight) | 30.6 | 27.3 |
| Degree of Swelling | 16 | 17.4 |
| Average Volume Particle Diameter (μm) | 9 | 8.7 |
| Molecular Weight (g/mol) | 158000 | 155000 |
| Pressure in First Step (mm Hg) | 30 | 400 |
| Temp. in First Step (° C.) | 200 | 170 |
| Pressure in Second Step (mm Hg) |  | 5 |
| Temp. in Second Step (° C.) |  | 200 |

TABLE 1 (1)-continued

|  | Example 1 | Example 2 |
|---|---|---|
| Remaining Volatile Content (ppm) | 1840 | 380 |
| Remaining Dimer and Trimer (ppm) | 7550 | 3600 |
| Oil Which Was Applied onto Test Piece | Deep-frying Oil Salad Oil Margarine Mayonnaise Lemon Oil | Deep-frying Oil Salad Oil Margarine Mayonnaise Lemon Oil |
| Critical Strain | ○ (No Cracks) | ○ (No Cracks) |

TABLE 1 (2)

|  | Example 3 | Example 4 |
|---|---|---|
| Gel Content (% by weight) | 28.3 | 28.5 |
| Degree of Swelling | 14.3 | 17.2 |
| Average Volume Particle Diameter (μm) | 8.8 | 8.8 |
| Molecular Weight (g/mol) | 162000 | 220000 |
| Pressure in First Step (mm Hg) | 50 | 400 |
| Temp. in First Step (° C.) | 215 | 170 |
| Pressure in Second Step (mm Hg) | 10 | 5 |
| Temp. in Second Step (° C.) | 200 | 200 |
| Remaining Volatile Content (ppm) | 60 | 390 |
| Remaining Dimer and Trimer (ppm) | 950 | 3400 |
| Oil Which Was Applied onto Test Piece | Deep-frying Oil Salad Oil Margarine Mayonnaise Lemon Oil | Deep-frying Oil Salad Oil Margarine Mayonnaise Lemon Oil |
| Critical Strain | ○ (No Cracks) | ○ (No Cracks) |

TABLE 1 (3)

|  | Example 5 | Comp. Example 1 |
|---|---|---|
| Gel Content (% by weight) | 28.8 | 31 |
| Degree of Swelling | 15.8 | 12.0 |
| Average Volume Particle Diameter (μm) | 8.8 | 9 |
| Molecular Weight (g/mol) | 180000 | 158000 |
| Pressure in First Step (mm Hg) | 400 | 20 |
| Temp. in First Step (° C.) | 170 | 240 |
| Pressure in Second Step (mm Hg) | 5 |  |
| Temp. in Second Step (° C.) | 200 |  |
| Remaining Volatile Content (ppm) | 350 | 910 |
| Remaining Dimer and Trimer (ppm) | 2800 | 4700 |
| Oil Which Was Applied onto Test Piece | Deep-frying Oil Salad Oil Margarine Mayonnaise Lemon Oil | Deep-frying Oil Salad Oil Margarine Mayonnaise Lemon Oil |
| Critical Strain | ○ (No Cracks) | Δ |

TABLE 1 (4)

|  | Comp. Example 2 | Comp. Example 3 |
|---|---|---|
| Gel Content (% by weight) | 27 | 28.5 |
| Degree of Swelling | 11.5 | 12.2 |
| Average Volume Particle Diameter (μm) | 8.7 | 8.8 |
| Molecular Weight (g/mol) | 155000 | 162000 |
| Pressure in First Step (mm Hg) | 400 | 50 |
| Temp. in First Step (° C.) | 190 | 235 |
| Pressure in Second Step (mm Hg) | 5 | 10 |
| Temp. in Second Step (° C.) | 220 | 220 |
| Remaining Volatile Content (ppm) | 250 | 30 |
| Remaining Dimer and Trimer (ppm) | 4300 | 1200 |
| Oil Which Was Applied onto Test Piece | Deep-frying Oil Salad Oil Margarine Mayonnaise Lemon Oil | Deep-frying Oil Salad Oil Margarine Mayonnaise Lemon Oil |
| Critical Strain | X | Δ |

TABLE 1 (5)

|  | Comp. Example 4 | Comp. Example 5 |
|---|---|---|
| Gel Content (% by weight) | 31 | 19 |
| Degree of Swelling | 10.5 | 12.5 |
| Average Volume Particle Diameter (μm) | 9 | 5.3 |
| Molecular Weight (g/mol) | 156000 | 205000 |
| Pressure in First Step (mm Hg) | 5 | 400 |
| Temp. in First Step (° C.) | 200 | 170 |
| Pressure in Second Step (mm Hg) |  |  |
| Temp. in Second Step (° C.) |  |  |
| Remaining Volatile Content (ppm) | 1100 | 2300 |
| Remaining Dimer and Trimer (ppm) | 34000 | 8600 |
| Oil Which Was Applied onto Test Piece | Deep-frying Oil Salad Oil Margarine Mayonnaise Lemon Oil | Deep-frying Oil Salad Oil Margarine Mayonnaise Lemon Oil |
| Critical Strain | X | X |

The rubber modified polystyrene composition of the present invention has excellent oil resistance. Even if the composition is used as a container for an oil, a tray for a refrigerator and the like which may contact oil leaking from the container, its physical properties are not impaired and it does not crack. In addition, the residual monomer, dimer and trimer are present only at trace levels, so that they do pose a risk to human health.

Obviously, numerous modifications and variations on the present invention are possible in light of the above teachings. It is therefore to be understood that within the scope of the appended claims, the invention may be practiced otherwise than as specifically described herein.

The priority documents of the present application, Japanese application 2000-323802, filed Oct. 24, 2000, and Japanese application 2001-006545, filed Jan. 15, 2001, and Japanese application 2001-078513, filed Mar. 19, 2001, are incorporated herein by reference.

What is claimed as new and is intended to be secured by Letters Patent is:

1. A rubber modified polystyrene composition comprising polybutadiene rubber particles having an average volume particle diameter of 6 to 13 μm, dispersed in a polystyrene, wherein the composition has a gel content of 25 to 35% by weight, a degree of swelling of 13 to 22, a residual volatile content of 2000 ppm or less, and a total amount of a dimer and a trimer of 8000 ppm or less.

2. The rubber modified polystyrene composition of claim 1, prepared by a process comprising:
   polymerizing styrene in the presence of polybutadiene rubber, thereby forming a polymerization solution comprising a rubber modified polystyrene composition containing rubber particles having an average volume particle diameter of 6 to 13 μm;
   foaming the polymerization solution at a pressure at or below the vapor pressure of the polymerization solution measured at the polymerization temperature;
   passing the foamed polymerization solution through a tubular heater while maintaining a uniform flow rate distribution, thereby heating the foamed polymerization solution;
   flushing the heated polymerization solution into a gas-liquid separator maintained at a pressure of 3 to 40 mm Hg and at a temperature of from 190 to 230° C.

3. The rubber modified polystyrene composition of claim 1, wherein the residual volatile content is 400 ppm or less, and the total level of the dimer and the trimer is 4500 ppm or less.

4. The rubber modified polystyrene composition of claim 3, prepared by a process comprising:
   polymerizing styrene in the presence of polybutadiene rubber, thereby forming a polymerization solution comprising a rubber modified polystyrene composition containing rubber particles having an average volume particle diameter of 6 to 13 μm;
   treating the polymerization solution in an apparatus comprising a pressure adjusting valve, a vertically arranged multitubular heat exchanger preheater having an ellipsoidal, dished, hemispherical or partially spherical head at an upper position thereof, and a devolatilizing tank directly connected to the multitubular heat exchanger type preheater;
   wherein said treating comprises:
      introducing the polymerization solution into the head of the multitubular heat exchanger preheater through the pressure adjusting valve;
      heating the polymerization solution with the multitubular heat exchanger preheater to a temperature of 150 to 180° C., thereby foaming the solution;
      separating a portion of an unreacted monomer and a solvent from the heated polymerization solution in the devolatilizing tank, maintained at a pressure of 200 to 600 mm Hg;
      discharging a primary treated solution comprising the rubber modified polystyrene composition and 3 to 15% by weight of the unreacted monomer and the solvent through the bottom of the devolatilizing tank;
      subjecting the primary treated solution to a second treatment in an apparatus comprising a conduit, a vertically arranged multitubular heat exchanger preheater having an ellipsoidal, dished, hemispherical or partially spherical head at an upper position thereof, and a devolatilizing tank directly connected to the multitubular heat exchanger type preheater;
   wherein the second treatment comprises:
      introducing the primary treated solution into the head of the multitubular heat exchanger type preheater through the conduit;
      heating the primary treated solution with the multitubular heat exchanger preheater to a temperature of 190 to 230° C., thereby foaming the primary treated solution; and
      separating the unreacted monomer and the solvent from the foamed primary treated solution in the devolatilizing tank maintained at a pressure of 10 mm Hg or less.

5. The rubber modified polystyrene composition of claim 1, wherein the residual volatile content is 100 ppm or less, and the total amount of dimer and trimer is 1500 ppm or less.

6. The rubber modified polystyrene composition of claim 5, prepared by a process comprising:
   polymerizing styrene in the presence of polybutadiene rubber, thereby forming a polymerization solution comprising a rubber modified polystyrene composition containing rubber particles having an average volume particle diameter of 6 to 13 μm;
   treating the polymerization solution in an apparatus comprising a pressure adjusting valve, a vertically arranged multitubular heat exchanger preheater having an ellipsoidal, dished, hemispherical or partially spherical head at an upper position thereof, and a devolatilizing tank directly connected to the multitubular heat exchanger type preheater;
   wherein said treating comprises:
      introducing the polymerization solution into the head through the pressure adjusting valve;
      heating the polymerization solution with the multitubular heat exchanger preheater to a temperature of 180 to 220° C., thereby foaming the polymerization solution;
      separating a portion of an unreacted monomer and a solvent from the foamed polymerization solution in the devolatilizing tank maintained at a pressure of 3 to 120 mm Hg;
      discharging from the devolatilizing tank a primary treated solution comprising the rubber modified polystyrene composition and 2% by weight or less of the unreacted monomer and the solvent through the bottom of the devolatilizing tank;
      subjecting the primary treated solution to a second treatment in an apparatus comprising a nozzle device for adding foaming agent, a static mixer, an extruding apparatus and a devolatilizing tank;

wherein the second treatment comprises:
    adding, through the nozzle device, a foaming agent comprising 0.5 to 3% by weight of water into the primary treated solution so that the foaming agent and primary treated solutions flow in opposite directions;
    introducing the primary treated solution having a foaming agent added thereto into a static mixer at a temperature higher than the vaporization temperature of the foaming agent at atmospheric pressure and at a temperature lower than the decomposition temperature of the primary treated solution, and at a pressure sufficient to prevent the primary treated solution from foaming;
    mixing the primary treated solution containing the foaming agent in the static mixer while maintaining a pressure higher than the vapor pressure of the foaming agent at the temperature of said mixing;
    introducing the mixed primary treated solution resulting from the static mixer into the devolatilizing tank maintained at a pressure of 10 to 20 mm Hg through an extruding apparatus having at least one opening section provided vertically and downward;
    forming the mixture into a foamed product at a temperature and a pressure such that a foaming coefficient B in the following equation (1) is 1.4 or more:

$$B = A'/A \tag{1}$$

wherein A is the cross-sectional area of the opening of the extruding apparatus, and A' is the average cross-sectional area of the foamed polymer composition measured in a horizontal plane at a position 50 cm to 1 m, in a vertical direction, below the opening, thereby devolatilizing rubber modified polystyrene composition and releasing the foaming agent; and
    separating the unreacted monomer, the solvent and the foaming agent in the devolatilizing tank.

7. The rubber modified polystyrene composition of claim 1, wherein the polybutadiene rubber has a Mooney viscosity measured at 100° C. (ML 1+4 (100° C.)) of 40 to 80, and a 5.43% by weight toluene solution of the polybutadiene rubber has a viscosity at 25° C. of 50 to 300 centipoise.

8. The rubber modified polystyrene composition of claim 3, wherein the polybutadiene rubber has a Mooney viscosity measured at 100° C. (ML 1+4 (100° C.)) of 40 to 80, and a 5.43% by weight toluene solution of the polybutadiene rubber has a viscosity at 25° C. of 50 to 300 centipoise.

9. The rubber modified polystyrene composition of claim 5, wherein the polybutadiene rubber has a Mooney viscosity measured at 100° C. (ML 1+4 (100° C.)) of 40 to 80, and a 5.43% by weight toluene solution of the polybutadiene rubber has a viscosity at 25° C. of 50 to 300 centipoise.

10. The rubber modified polystyrene composition of claim 1, wherein the polystyrene has a weight-average molecular weight of 140,000 to 280,000.

11. The rubber modified polystyrene composition of claim 3, wherein the polystyrene has a weight-average molecular weight of 140,000 to 280,000.

12. The rubber modified polystyrene composition of claim 5, wherein the polystyrene has a weight-average molecular weight of 140,000 to 280,000.

13. The rubber modified polystyrene composition of claim 1, wherein the average volume particle diameter is 8 to 11 μm.

14. The rubber modified polystyrene composition of claim 1, wherein the degree of swelling is 14 to 18.

15. The rubber modified polystyrene composition of claim 1, wherein the polystyrene is a polystyrene copolymer prepared by polymerizing a mixture of styrene and a monomer copolymerizable with styrene.

16. The rubber modified polystyrene composition of claim 15, wherein the monomer copolymerizable with styrene is selected from the group consisting of α-methylstyrene, p-methylstyrene, acrylonitrile, methacrylonitrile, methyl acrylate, n-butyl acrylate, methyl methacrylate, maleic anhydride, maleimide, N-phenylmaleimide, methacrylic acid and mixtures thereof.

17. A method for preparing the rubber modified polystyrene composition of claim 1, comprising:
    polymerizing styrene in the presence of polybutadiene rubber, thereby forming a polymerization solution comprising a rubber modified polystyrene composition containing rubber particles having an average volume particle diameter of 6 to 13 μm;
    foaming the polymerization solution at a pressure at or below the vapor pressure of the polymerization solution measured at the polymerization temperature;
    passing the foamed polymerization solution through a tubular heater while maintaining a uniform flow rate distribution, thereby heating the foamed polymerization solution;
    flushing the heated polymerization solution into a gas-liquid separator maintained at a pressure of 3 to 40 mm Hg and at a temperature of from 190 to 230° C.

18. A method for preparing the rubber modified polystyrene composition of claim 3, comprising:
    polymerizing styrene in the presence of polybutadiene rubber, thereby forming a polymerization solution comprising a rubber modified polystyrene composition containing rubber particles having an average volume particle diameter of 6 to 13 μm;
    treating the polymerization solution in an apparatus comprising a pressure adjusting valve, a vertically arranged multitubular heat exchanger preheater having an ellipsoidal, dished, hemispherical or partially spherical head at an upper position thereof, and a devolatilizing tank directly connected to the multitubular heat exchanger type preheater;
    wherein said treating comprises:
        introducing the polymerization solution into the head of the multitubular heat exchanger preheater through the pressure adjusting valve;
        heating the polymerization solution with the multitubular heat exchanger preheater to a temperature of 150 to 180° C., thereby foaming the solution;
        separating a portion of an unreacted monomer and a solvent from the heated polymerization solution in the devolatilizing tank, maintained at a pressure of 200 to 600 mm Hg;
        discharging a primary treated solution comprising the rubber modified polystyrene composition and 3 to 15% by weight of the unreacted monomer and the solvent through the bottom of the devolatilizing tank;
        subjecting the primary treated solution to a second treatment in an apparatus comprising a conduit, a vertically arranged multitubular heat exchanger preheater having an ellipsoidal, dished, hemispherical or partially spherical head at an upper position thereof, and a devolatilizing tank directly connected to the multitubular heat exchanger type preheater;

wherein the second treatment comprises:
introducing the primary treated solution into the head of the multitubular heat exchanger type preheater through the conduit;
heating the primary treated solution with the multitubular heat exchanger preheater to a temperature of 190 to 230° C., thereby foaming the primary treated solution; and
separating the unreacted monomer and the solvent from the foamed primary treated solution in the devolatilizing tank maintained at a pressure of 10 mm Hg or less.

19. A method of preparing the rubber modified polystyrene composition of claim 3 comprising:
polymerizing styrene in the presence of polybutadiene rubber, thereby forming a polymerization solution comprising a rubber modified polystyrene composition containing rubber particles having an average volume particle diameter of 6 to 13 $\mu$m;
treating the polymerization solution in an apparatus comprising a pressure adjusting valve, a vertically arranged multitubular heat exchanger preheater having an ellipsoidal, dished, hemispherical or partially spherical head at an upper position thereof, and a devolatilizing tank directly connected to the multitubular heat exchanger type preheater;
wherein said treating comprises:
introducing the polymerization solution into the head through the pressure adjusting valve;
heating the polymerization solution with the multitubular heat exchanger preheater to a temperature of 180 to 220° C., thereby foaming the polymerization solution;
separating a portion of an unreacted monomer and a solvent from the foamed polymerization solution in the devolatilizing tank maintained at a pressure of 3 to 120 mm Hg;
discharging from the devolatilizing tank a primary treated solution comprising the rubber modified polystyrene composition and 2% by weight or less of the unreacted monomer and the solvent through the bottom of the devolatilizing tank;
subjecting the primary treated solution to a second treatment in an apparatus comprising a nozzle device for adding foaming agent, a static mixer, an extruding apparatus and a devolatilizing tank;
wherein the second treatment comprises:
adding, through the nozzle device, a foaming agent comprising 0.5 to 3% by weight of water into the primary treated solution so that the foaming agent and primary treated solutions flow in opposite directions;
introducing the primary treated solution having a foaming agent added thereto into a static mixer at a temperature higher than the vaporization temperature of the foaming agent at atmospheric pressure and at a temperature lower than the decomposition temperature of the primary treated solution, and at a pressure sufficient to prevent the primary treated solution from foaming;
mixing the primary treated solution containing the foaming agent in the static mixer while maintaining a pressure higher than the vapor pressure of the foaming agent at the temperature of said mixing;
passing the primary treated solution containing the foaming agent through static mixer for at least a second time;
introducing the mixed primary treated solution into the devolatilizing tank maintained at a pressure of 10 to 20 mm Hg through an extruding apparatus having at least one opening section provided vertically and downward;
forming the mixture into a foamed product at a temperature and a pressure such that a foaming coefficient B in the following equation (1) is 1.4 or more:

$$B=A'/A \qquad (1)$$

wherein A is the cross-sectional area of the opening of the extruding apparatus, and A' is the average cross-sectional area of the foamed polymer composition measured in a horizontal plane at a position 50 cm to 1 m, in a vertical direction, below the opening, thereby devolatilizing rubber modified polystyrene composition and releasing the foaming agent; and
separating the unreacted monomer, the solvent and the foaming agent in the devolatilizing tank.

20. A container for food comprising the rubber modified polystyrene composition of claim 1.

21. A container for food comprising the rubber modified polystyrene composition of claim 3.

22. A container for food comprising the rubber modified polystyrene composition of claim 5.

23. The composition of claim 1, prepared by a process comprising
polymerizing styrene in the presence of polybutadiene rubber to form a polymerized solution and devolatilizing the polymerization solution.

* * * * *